United States Patent [19]

Sjödin

[11] 4,179,707

[45] Dec. 18, 1979

[54] AUTOMATIC MEASUREMENT OF LENGTHS OF ELONGATED WORKPIECES

[75] Inventor: Bo Sjödin, Jönköping, Sweden

[73] Assignee: Saab-Scania Aktiebolag, Linkoping, Sweden

[21] Appl. No.: 841,378

[22] Filed: Oct. 12, 1977

[30] Foreign Application Priority Data

Oct. 13, 1976 [SE] Sweden ................................ 7611329

[51] Int. Cl.$^2$ ............................................. H04N 7/18
[52] U.S. Cl. .................................. 358/107; 250/560; 250/223 R
[58] Field of Search ................ 358/107, 101; 250/560, 250/561, 223 R

[56] References Cited

U.S. PATENT DOCUMENTS

| | | | |
|---|---|---|---|
| 2,910,908 | 11/1959 | Meyer, Jr. | 250/560 |
| 3,886,372 | 5/1975 | Sanglert | 250/571 |
| 3,963,938 | 6/1976 | Sanglert | 250/561 |
| 4,115,803 | 9/1978 | Morton | 358/107 |

Primary Examiner—Robert L. Griffin
Assistant Examiner—Edward L. Coles
Attorney, Agent, or Firm—James R. Custin

[57] ABSTRACT

A conveyor defines a plane in which elongated workpieces, substantially parallel to one another, are transported transversely to their lengths through a measuring zone at which each workpiece is illuminated from above and lengthwise scanned by an array camera. A pit at the measuring zone has its bottom below said plane and in shadow, to provide a strongly contrasting background for the workpiece being scanned. To accommodate skewed workpieces, the array camera makes repeated scans of each workpiece as it passes the measuring zone, and data from such scanning is stored in a computer memory. Detectors cooperate with the array camera and the computer, signaling entry of each workpiece into the measuring zone and its departure therefrom. Thickness of each workpiece is measured near the measuring zone; and in calculating length of a workpiece from the stored scanning data for it, compensation is made for scanning parallax due to thickness.

7 Claims, 6 Drawing Figures

AUTOMATIC MEASUREMENT OF LENGTHS OF ELONGATED WORKPIECES

This invention relates generally to automatic measurement of the length of each of a succession of elongated workpieces as they move transversely to their lengths; and the invention is more particularly concerned with a method and means for making such measurements with great accuracy notwithstanding adverse conditions in the environment in which the measurements are made.

Although the present invention can be advantageously applied to measuring the lengths of many kinds of workpieces, the objectives and advantages of the invention are particularly apparent in relation to measurement of boards in a sawmill for the purpose of trimming them to optimum standard lengths or to classify them for storing or shipping. Accordingly, and merely by way of example, the invention will be described and explained in relation to a sawmill operation.

To conserve valuable floor space in a sawmill, boards are transported through a length-measuring station by means of a relatively wide conveyor on which the boards are arranged more or less parallel to one another, with their lengths substantially transverse to the direction in which they are moving. A prior arrangement for automatically measuring the length of each board as it moved through the station comprised a battery of photoelectric cells or other detectors that were aligned in a row extending across the conveyor. As a board passed the row of detectors, it activated certain of them to produce responsive outputs, and the length of the board was signified by the number of detectors that issued such outputs. Inasmuch as the detectors were spaced apart by uniform intervals, the board was in effect measured in length units corresponding to the distance intervals between adjacent detectors. To keep the number of detectors at a reasonable value, the distances between them had to be so large that the difference between the measured and the actual lengths of a board could be as great as 30 cm (about 12 inches). This discrepancy was of substantial economic significance. It resulted in a decrease in potential profits because measurement values obtained from the apparatus usually designated boards as being shorter than their actual lengths. When boards were trimmed to standard lengths on the basis of such measurements, there was not only a loss of possible profits but a waste of valuable raw materials.

By contrast, it is a general object of the present invention to provide a method and means for making length measurements on each of a succession of elongated workpieces that are moving transversely to their lengths, which method and means is at least as fast as prior length measurement expedients but is very much more accurate and therefore more profitable and less wasteful.

Another general object of this invention is to provide simple and inexpensive but fast and very accurate automatic apparatus for measuring the lengths of successive elongated workpieces moving transversely to their lengths, which apparatus requires a minimum of floor space and can be quickly and easily installed and adjusted in either a new material handling system or in an existing one.

In general, the present invention contemplates lengthwise scanning of each workpiece by means of an array camera, the output of which signifies the length of the workpiece. An array camera is a known device comprising a large number of small, very closely spaced photosensitive elements that are arranged in a row at the focal plane of a lens. By electronic means, outputs are taken in succession from the several photo-sensitive elements along the row, and the output of each element is dependent upon whether the small portion of the image that is focused upon that particular element is lighted or dark. Since the scanning is effected electronically, the array camera remains stationary during the scanning process.

Employment of an array camera in lieu of the prior battery of spaced individual detectors affords obvious advantages, the most significant of these being that the number of photosensitive elements in an array camera can very greatly exceed the number of detectors that it was practical to incorporate in the prior apparatus, and consequently much greater measurement accuracy is possible with an array camera. However, the use of an array camera for the purpose here contemplated poses a number of problems that do not have obvious solutions. For example, an array camera has an extremely rapid scanning cycle, and if it makes a scan along a board that is substantially skewed in relation to the scanning direction, the output that it produces in response to that scan will correspond to a much shorter length than the board actually has. Or if the background of a board being scanned by an array camera reflects a substantial amount of light, the camera may be unable to detect the end edges of the board. In a lumber mill the needed contrast can not be reliably obtained by merely providing a dark background surface upon which the workpiece rests while being scanned, because the prevalent dust and sawdust would be likely to settle on such a surface and sooner or later increase its reflectivity to a value approaching that of a board surface. Consideration must also be given to the fact that during the course of each scan by an array camera, there is a constantly changing angle between the optical axis of the camera and the particular ray of light from the board that the camera is momentarily responding to, with the result that there tends to be a parallax error whereby a thick board of a given length may be measured as having a greater length than a thin board of the same length, due to the difference in the distances between the camera and the respective top surfaces of the two boards.

Thus it is another general object of the present invention to enable an array camera to be very successfully employed for rapid and accurate measurement of the lengths of elongated workpieces that are arranged more or less parallel to one another and are successively moving through a measuring zone in a direction transverse to their lengths.

In this connection it is a specific object of the invention to provide a method and means for avoiding parallax error when the lengths of boards of different thicknesses are being measured by means of an array camera, and for preventing erroneous measurements of boards that are oriented in skewed relation to the line along which the array camera scans.

It is also a specific object of this invention to provide automatic length measuring equipment of the character described which is not adversely affected as to its accuracy or reliability by unfavorable environmental conditions and which is therefore particularly suitable for measuring the lengths of boards in sawmills.

Another specific and very important object of this invention is to provide automatic length measuring apparatus of the character described having means for presenting a strong contrast between the light reflecting surface of a workpiece that is being scanned for measurement by an array camera and a background that is within the field of scan of the array camera, so that the ends of the workpiece are definitely detectable by the array camera and the camera output therefore corresponds accurately to the length of the workpiece.

With these observations and objectives in mind, the manner in which the invention achieves its purpose will be appreciated from the following description and the accompanying drawings, which exemplify the invention, it being understood that changes may be made in the specific method and apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 5:
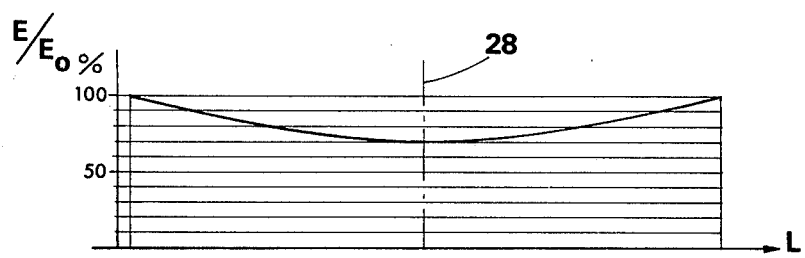
Figure 6:
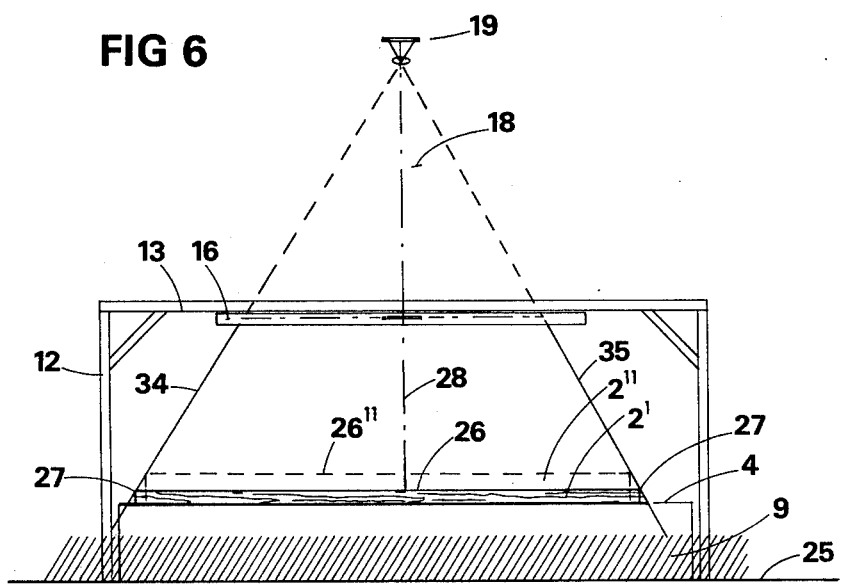

FIG. 5 is a graph illustrating an example of a preferred variation of light intensity along the length of the measuring zone; and FIG. 6 is a more or less diagrammatic vertical sectional view through the measuring zone, taken on a plane containing the scanning line, and illustrating how an error due to parallax can occur if scanning results are taken without compensation for the thickness of the workpiece being scanned.

Referring now to the accompanying drawings, the numeral 1 designates generally a portion of a conveyor by which elongated workpieces 2 are transported from one part of a plant to another, the illustrated portion of the conveyor being that which extends through a length measuring station embodying the principles of this invention. Assuming for purposes of example that the workpieces 2 are boards of various unknown lengths, the conveyor 1 may be transporting them from a station or stations at which they have been trimmed to desired widths and thicknesses, towards a station at which they are sorted as to length for storage or shipment, or at which they are trimmed to standard lengths or to other predetermined lengths. In any case, the workpieces 2 are arranged on the conveyor 1 more or less parallel to one another, and they are transported in a direction that is transverse to their lengths, the transporting direction being denoted by the arrow 5. The width of the conveyor 1 is therefore at least equal to the length of the longest workpiece to be transported on it.

The conveyor can comprise platelike floor elements having their upper surfaces defining a plane 4 in which the workpieces move. In this case workpieces are carried along by a plurality of endless chains 3, arranged with parallel upper transporting stretches which are driven in unison in the transporting direction 5 and which all lie on, or just under, the plane 4. Pushers 6 attached to each chain, at intervals along its length, run in slots or grooves 7 between the plate-like floor elements and project above the plane 4 to drivingly engage the workpieces. The pushers on the several chains are arranged in rows that extend across the width of the conveyor, so that the pushers establish and maintain the workpieces in their orientations transverse to the transporting direction.

It will be understood that the conveyor could take any of a number of forms different from the one here illustrated, wherein the plane 4 is assumed to be horizontal. For example, if the plane 4 had a substantial downward inclination in the transporting direction, the endless chains 3 and their pushers 6 could be omitted, and the workpieces 2 could slide along the conveyor under the force of gravity. In that case the workpieces would tend to be in contiguous side-by-side relationship to one another, instead of being spaced apart laterally, as shown.

As a workpiece on the conveyor is carried in the transporting direction, it moves across an elongated measuring zone 8 which is relatively narrow in the transporting direction but which is long enough to extend across substantially the entire width of the conveyor. The extension of the measuring zone in the transporting direction (i.e., its width) should be somewhat greater than the width of the widest workpiece to be measured, and its length should be somewhat greater than the length of the longest workpiece to be measured. The measuring zone is preferably defined by a discontinuity in the plate-like floor elements that have their upper surfaces on the plane 4, which discontinuity forms the mouth of a pit or well 9 across which workpieces can be carried on the chains 3. The bottom surface 25 of the pit 9, which is spaced below the plane 4, is at least coextensive with the measuring zone, that is, it extends all along and across the measuring zone to provide a background, as explained below, for workpieces scanned at the measuring zone.

As each workpiece passes across the measuring zone 8 in the course of its transportation by the conveyor, the workpiece is lighted by illumination means 14 and is scanned along its length by an array camera 19. The output of the array camera, which is fed to an electronic data processor 30, corresponds to the scanned length of the workpiece.

The illumination means 14 is illustrated as a row of floodlights mounted on a beam 13 which extends parallel to the length of the measuring zone 8 at a substantial distance above the conveyor and which has its opposite ends supported on uprights 12 at each side of the conveyor. Although the terms "light" and "illumination" are herein used to denote the radiation from these floodlights, an array camera tends to respond best to red and infra-red radiation. Therefore it will be understood that the floodlights 14 may produce radiation at frequencies outside the visible spectrum, and that they are designated "floodlights" because they emit their "light"—visible or invisible—in a somewhat divergent beam as does a visible-light floodlight.

Figure 4:
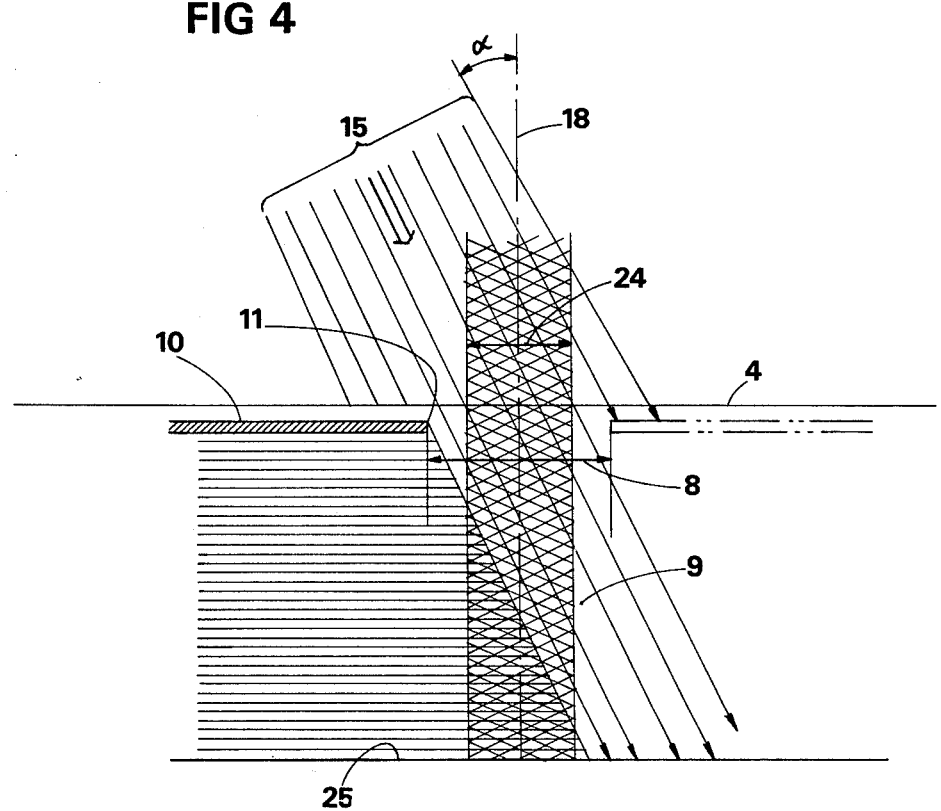
FIG. 4 is a vertical sectional view through the measuring zone of the apparatus, to a larger scale and with more detail than FIG. 2.

For reasons which will appear as the description proceeds, the row of floodlights 14 is spaced in the transporting direction from the measuring zone, and therefore the rays of light from the floodlights, which are designated by 15 in FIG. 4 and which of course shine towards the measuring zone, are oblique to the plane 4 in which the measuring zone lies. It will be apparent that the illumination means 14 and the bottom surface 25 of the pit 9 are spaced to opposite sides of the plane 4 in which the workpieces move and which contains the measuring zone, inasmuch as the illumination means 14 is above that plane and the surface 25 is below it.

Figure 2:
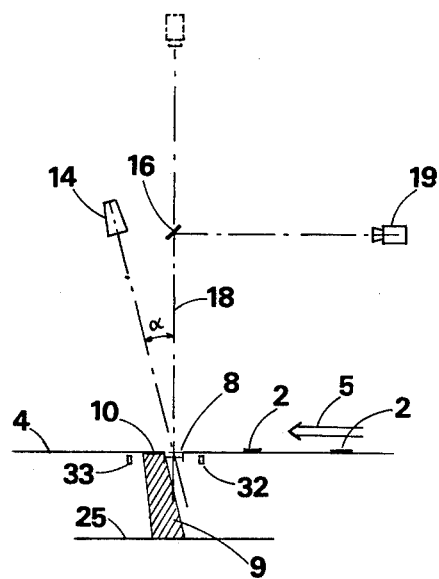
FIG. 2 is a fragmentary and more or less diagrammatic side view of a portion of the apparatus shown in FIG. 1, at the measuring zone thereof.

The array camera 19 must of course be located in the path 18 of light that is reflected from a workpiece at the measuring zone. A workpiece reflects such light in a direction substantially normal to the plane 4, and to the side of that plane at which the illumination means is located; hence, the array camera could be located directly above the measuring zone, in the position denoted by broken lines in FIG. 2. However, even though the array camera has a wide angle lens, as is preferred, it must be located at a substantial distance from the measuring zone to ensure that its scan will sweep the entire length of that zone. Therefore to accommodate low ceiling heights, the reflected light path 18 in which the array camera is located can be defined in part by a plane mirror 16 that is mounted on the floodlight supporting beam 13, directly over the measuring zone. The mirror 16 can be long and narrow and can extend lengthwise parallel to the measuring zone. Preferably the mirror 16 is secured to the beam 13 by means of an elongated metal housing 17 that has a V-shaped profile and supportingly engages the mirror along its longitudinal edges to maintain flatness of its reflecting surface. The housing 17 holds the mirror 16 at such an inclination to the plane 4 that the mirror directs reflected light from the workpiece along a reflected light path portion which is substantially parallel to the plane 4 and which terminates at the array camera 19. The camera 19 can therefore be at about the same elevation above the plane 4 as the illumination means 14, but at a location which is spaced from the measuring zone by a substantial distance along the transporting direction.

As shown, the array camera is mounted on a frame or supporting stand which is similar to the one that supports the floodlights 14 and comprises the beam 13 and uprights 12. The support for the array camera preferably provides for adjustment of its location.

It will be apparent that the array camera must be so arranged that its effective direction of scan is lengthwise along the measuring zone. Hence the workpieces and the measuring zone can be regarded as extending lengthwise in a scanning direction that is transverse to the transporting direction 5.

It will also be apparent that the array camera must be so located and arranged that its optical axis is optically equidistant from the opposite ends of the measuring zone. The term "optically equidistant" is used to signify that even though the physical location of the array camera might be asymmetrical to the length of the measuring zone (assuming a suitable arrangement of reflectors or the like) the optical arrangement must have the same effect as if the array camera and the ends of the measuring zone formed an isosceles triangle, with the array camera at the apex of the like sides of that triangle and the optical axis of the camera bisecting the angle between those sides.

In scanning a workpiece at the measuring zone, the array camera must of course receive well defined inputs denoting the respective ends of the workpiece, so that its output can accurately correspond to the length of the workpiece. This is to say that the workpiece, and particularly its end portions, should have a strongly contrasting background. In accordance with the present invention, the desired contrast is provided by the pit or well 9, and particularly by the bottom surface 25 thereof, which is shadowed from the illumination of the floodlights 14 by means of an opaque screening means 10 interposed between the illumination means and said bottom surface 25.

In the illustrated example, the screening means 10 comprises a portion of the plate-like floor elements that define the plane 4, which floor element portions have an edge 11 that defines one edge of the measuring zone. Because the floodlights 14 are spaced along the transporting direction from the measuring zone, and shine towards it obliquely to the plane 4, as explained above, there is an acute angle $\alpha$ between the light rays 15 from the floodlights and that portion of the reflected light path 18 that extends from the measuring zone. By reason of that angle $\alpha$ and the location of the edge 11 of the screening means 10, the bottom surface 25 of the pit 9 is shadowed from the rays of the floodlights 14, even though the top surface of any workpiece at the measuring zone is fully lighted by them. The measuring zone thus comprises a scanning area 24 in which an object on or above the plane 4 is well lighted but, as viewed from the array camera, appears in strong contrast to a darkly shadowed background.

Since the contrast is provided by the bottom surface 25 of the pit 9, it can be regarded as a background surface. And because the portion of that background surface that is visible at the scanning area 24 is shadowed, the presence of dust or sawdust on that background surface 25 cannot materially diminish the contrast that it presents to a workpiece being scanned. Furthermore, because the background surface 25 is disposed wholly at the side of the plane 4 that is opposite the illumination means 14 and the reflected light path 18, that surface can be defined, for example, by a plate installed beneath the plane of the measuring zone, extending along the whole length of that zone and having a matte black or other nonreflecting surface, which plate can have a substantial inclination to the horizontal to minimize accumulations of dust and sawdust upon it.

To obtain correct length measurements of workpieces that may be substantially crooked along their lengths, or may be skewed on the conveyor so that they extend obliquely to the scanning direction, the array camera scans repetitively along the measuring zone at a cycling rate fast enough for several measuring cycles to be accomplished during the time that a workpiece is at the measuring zone, even though the workpiece maintains its rapid transporting motion as it passes through that zone. The outputs of the array camera for the several scans of a workpiece are stored in the memory of the electronic data processor 30 to which the camera is connected, and when scanning of the workpiece is completed, upon its departure from the measuring zone, the stored data is used to calculate the length of the workpiece.

Just before a workpiece enters the measuring zone 8, it passes an entry detector 32, which can be a photo-sensitive element mounted at or slightly below the plane 4, in line with a hole in the plate-like floor elements which define that plane. The entry detector 32 feeds a starting signal to the electronic data processor 30 to signify to it that it is to begin storing outputs from the array camera that relate to a workpiece arriving at the measuring zone. If the workpiece is skewed, its end portion that first enters the measuring zone is scanned in a first scanning cycle of the array camera; and as further portions of the workpiece successively move into the measuring zone, they are scanned in turn, during succeeding scanning cycles, until the entire workpiece has passed through the measuring zone and has been scanned. A departure detector 33, which can be similar to the entry detector 32, is passed by the workpiece just after it leaves the measuring zone, and the departure detector 33 issues a signal which signifies to the data processor that the workpiece has been completely scanned. In response to this signal, the scanning data for that workpiece, stored in the memory unit, can be assembled and used for the length calculation. Alternatively, there could be only a single detector, corresponding to the departure detector 33, and its detection of the leading edge of a workpiece leaving the measuring zone would cause the data processor to start assembling the data stored during the scanning of that workpiece and to make the length calculation from it, while detection of the trailing edge of the workpiece would cause issuance of another signal that would cause the calculated measurement value for the workpiece to be transmitted to a numerical display device 31 or to an automatic trimming device (not shown).

If all of the workpieces being measured are of uniform thickness (i.e., have their upper, reflecting surfaces 26 at a uniform elevation above the plane 4), the outputs of the array camera for each workpiece, suitably assembled and calibrated, can be taken as direct measurements of length. In a lumber mill, however, it will usually happen that boards transported through the length-measuring station are of varying random thicknesses as well as of varying random lengths, and therefore the outputs of the array camera for different boards are not directly comparable. Referring to FIG. 6, when the array camera scans the long but relatively thin board 2', the opposite end edges 27 of that board are detected as being defined by the rays of reflected light along the lines 34 and 35, respectively. But rays along those same lines 34 and 35 would also signify the ends of a thicker but somewhat shorter board 2''. Therefore, assuming that the length output of the array camera had corresponded to the actual length of the thin board 2', that same output, unmodified, would attribute an excessive length to the thicker board 2''.

It is apparent, therefore, that the output of the array camera must be modified in accordance with a trigonometric function of workpiece thickness, being scaled down by greater amounts for boards of greater thickness. Thickness can be measured manually, especially if the stream of workpieces is of uniform thickness, but in most cases it will be preferable to use one of the known automatic devices. The particular thickness measuring device 29 that is here illustrated comprises a transducer mounted above the plane 4, connected with a pair of arms or feelers that are arranged as calipers and are so located as to be engaged by every workpiece on the conveyor just before the workpiece reaches the measuring zone 8. A workpiece swings the arms apart to an extent that depends upon its thickness, causing the transducer to issue a corresponding output which is fed to the memory unit of the electronic data processor 30. The calculator means of the data processor employs that thickness information, in conjunction with the stored outputs of the array camera that pertain to the same workpiece, to calculate final output that accurately signifies the length of the workpiece. As illustrated, the final output is presented as a numerical display 31 at the data processor, but it will be understood that the same final output could alternatively or additionally be employed for automatic control of trimming means by which workpieces are finished to standardized lengths.

Figure 3:
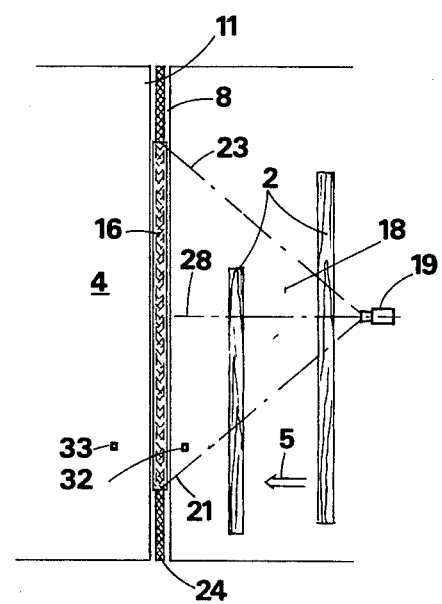
FIG. 3 is a more or less diagrammatic plan view of the portion of the apparatus shown in FIG. 1.

If each workpiece being scanned were illuminated with uniform intensity all along its length, light coming to the array camera from the end portions of a long workpiece would have a lesser intensity at the camera than light coming from its medial portion. Referring to FIG. 3, it will be seen that light reflected from the end portions of a workpiece at the measuring zone must reach the array camera 19 by way of the relatively long paths 21, 23, and therefore tends to arrive at the camera with lesser intensity than light reflected from the medial portion of the workpiece, which reaches the camera along the considerably shorter path 28 that is on or near the camera axis. This effect is especially marked if the array camera has a wide angle lens (as is preferred) to give it the wide scanning angle needed for measuring the longest workpieces, where workpieces have widely varying lengths, as commonly occurs in the lumber industry. The effect is all the greater if there is a substantial amount of dust in the air (as is common in sawmills) to cause greater diffusion of light along the longer light paths. Under the conditions just described, the array camera might not respond accurately to the end portions of a workpiece and would produce an inaccurate measurement output.

Figure 1:
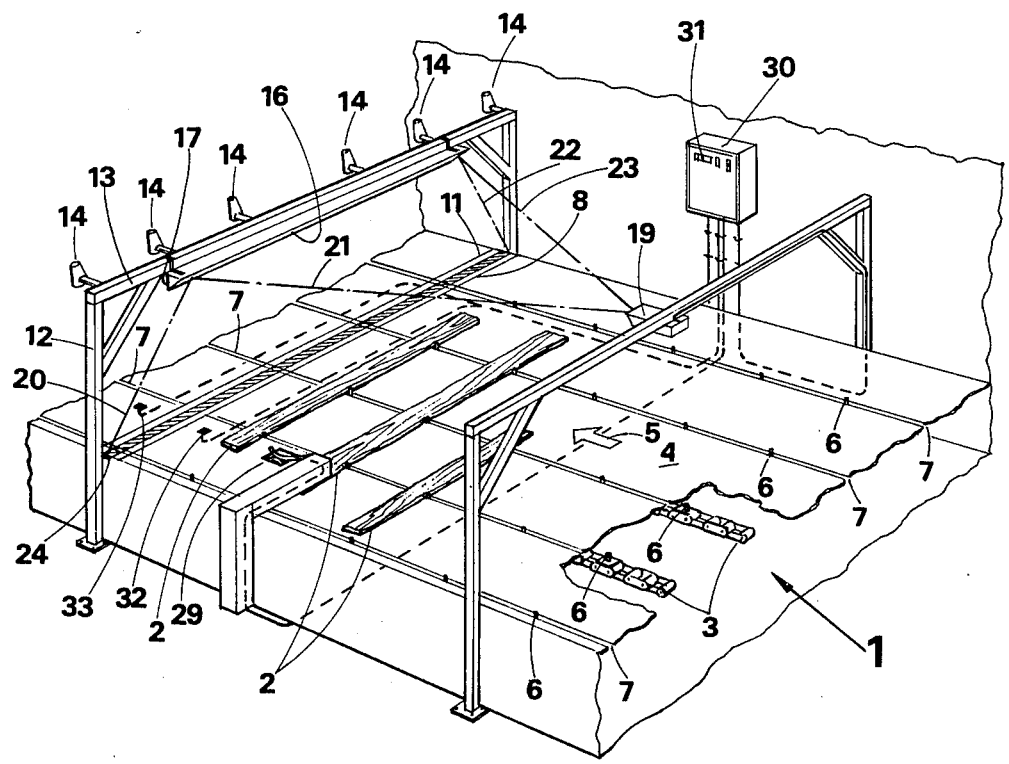
FIG. 1 is a perspective view of automatic length measuring apparatus that embodies the principles of this invention.

To compensate for the above described conditions, the measuring zone 8 is lighted non-uniformly along its length, the intensity of illumination being lowest at the center of that zone and increasing in intensity towards the ends thereof. FIG. 5 depicts graphically an illustrative scheme of variation of relative intensities of illumination along the length of the measuring zone that has been found suitable for a typical installation embodying the present invention, and whereby the intensity of reflected light reaching the array camera is caused to be uniform all along the scan. The desired variation in lighting intensity along the length of the measuring zone can be obtained either by adjusting individual floodlights 14 to different angles, so that there is more overlapping of their beams at the end portions of the measuring zone, or, as shown in FIG. 1, by locating them closer together at the end portions of the measuring zone than at its medial portion.

It will be observed that with the above described apparatus, the direction of transport can be reversed with no more than an interchange of the connections to the entry and departure detectors 32 and 33.

With the automatic measuring method and apparatus of this invention, the length of a workpiece can be ascertained with an error of less than 2 to 3 cm (about 1 inch), which is to say that measurement accuracy is improved by a factor of ten as compared to prior automatic length measuring apparatus used in sawmills.

From the foregoing description taken with the accompanying drawings it will be apparent that this invention provides a fast, accurate, simple and very reliable method and means for automatically measuring the length of each of a plurality of elongated workpieces that are lengthwise parallel to one another and are being transported transversely to their lengths; and it will be further apparent that apparatus embodying the invention is particularly well suited for sawmill installations.

Those skilled in the art will appreciate that the invention can be embodied in forms other than as herein disclosed for purposes of illustration.

The invention is defined by the following claims.

I claim:

1. Apparatus for automatically producing an output corresponding to the length of each of a plurality of elongated workpieces, said apparatus being characterized by:
   A. transporting means for supporting workpieces with their lengths extending substantially in a scanning direction and for moving the workpieces transversely to said scanning direction, said transporting means defining a plane in which the workpieces move and in which there is an elongated measuring zone that extends lengthwise in the scanning direction and is at least as long as the longest workpiece to be measured;
   B. an array camera optically equidistant from the opposite ends of the measuring zone and located in a reflected light path that has a portion extending to one side of said plane from the measuring zone, said array camera being arranged to scan along the length of the measuring zone and being responsive to light reflected from said zone to produce an output corresponding to the length of a segment along said zone from which light is reflected;
   C. illumination means for enabling a workpiece at the measuring zone to reflect light along said reflected light path, said illumination means being
      (1) spaced to said one side of said plane,
      (2) spaced in one direction transverse to the scanning direction from said portion of the reflected light path, and
      (3) arranged for illuminating the measuring zone all along the length thereof;
   D. means defining a background surface which
      (1) is spaced to the opposite side of said plane,
      (2) faces towards said plane, and
      (3) is at least coextensive with the length and width of the measuring zone; and
   E. opaque screening means located between said illumination means and said background surface and spaced in said one direction transverse to the scanning direction from said portion of the reflected light path, said screening means being arranged to shadow the background surface from light from the illumination means so that the shadowed background surface provides a strong contrast to the light reflecting surface of a workpiece as the measuring zone, to afford accuracy in scanning the workpiece.

2. The apparatus of claim 1 wherein said plane is substantially horizontal and wherein said array camera and said illumination means are spaced above said plane, further characterized by:
   F. a plane mirror which is located above the measuring zone at an end of said portion of the reflected light path, said mirror being inclined to said plane and arranged to direct reflected light from the measuring zone along another portion of said reflected light path, towards the array camera, the array camera being horizontally spaced from the measuring zone in the opposite direction transverse to the scanning direction.

3. The apparatus of claim 1, further characterized by: the illumination means being further arranged to illuminate the measuring zone with an intensity that increases gradually from the medial portion of the measuring zone towards each end thereof, so that rays of reflected light which traverse longer distances along said reflected light path, from the ends of the measuring zone to the array camera, have substantially the same intensity at the array camera as those rays that are reflected from the center of the measuring zone and traverse shorter distances along said path.

4. The apparatus of claim 1, further characterized by: said opaque screening means having a surface which lies in said plane and over which workpieces are carried, and having an edge which defines one longitudinal side edge of the measuring zone.

5. A method by which a repetitively scanning array camera is employed for automatic measuring of the length of each of a succession of elongated workpieces that are arranged substantially parallel to one another, with their lengths extending substantially in a scanning direction, while the workpieces are moving in a direction transverse to said scanning direction through a measuring zone at which each workpiece is scanned along its length by the array camera, said method being characterized by:
   A. for each workpiece that moves through the measuring zone, storing the scanning outputs produced by the array camera for each of a plurality of successive scans made while the workpiece is at the measuring zone, so that if the workpiece is skewed relative to the scanning direction, the stored scanning outputs will each contain information about a portion of the length of the workpiece and will together contain information about the entire length of the workpiece;
   B. issuing a signal as each workpiece leaves the measuring zone; and
   C. continuing to retain in storage scanning outputs for each workpiece until the said signal has been issued for the workpiece, so that information for the entire workpiece is available in the form of stored scanning outputs at the time said signal issues, to enable a calculation of the length of the workpiece to be made from said stored outputs.

6. The method of claim 5, further characterized by:
   C. while each workpiece is near the measuring zone, measuring the thickness of the workpiece and producing a thickness output corresponding to the measured thickness, for use in conjunction with said stored outputs for calculating the length of the workpiece.

7. Apparatus wherein elongated workpieces that are substantially parallel to one another and are moving in a transporting direction transverse to their lengths pass through a measuring zone at which each workpiece is scanned by an array camera for automatic measurement of its length, said measuring zone being elongated transversely to said transporting direction and said array camera being arranged to scan lengthwise along the measuring zone, said apparatus being characterized by:
   A. carrying means defining carrying surfaces upon which workpieces are supported for movement in said transporting direction, said carrying surfaces facing substantially upwardly and lying in a plane that contains said measuring zone;
   B. background means defining a background surface that faces substantially upwardly and is spaced below said plane;
   C. illumination means located above said plane and arranged to illuminate said measuring zone along the length thereof;
   D. the array camera being located above said plane and being arranged to respond to reflected light directed in a substantially upward direction from the measuring zone;

E. said carrying means being further so arranged that in the measuring zone
   (1) no more than a substantially small amount of its carrying surfaces reflect light upwardly, and
   (2) it provides a light permeable opening at said plane, substantially coextensive with the measuring zone, such that when there is no workpiece at the measuring zone substantially all upwardly reflected light thereat is that which emanates from said background surface; and
F. opaque screening means interposed between said illumination means and said background surface and arranged to shadow the background surface so that the same is prevented from reflecting light upwardly, thus ensuring that substantially all light reflected to the array camera from the measuring zone is that which emanates from workpieces at said zone.

* * * * *